United States Patent [19]

Strong

[11] 4,340,576
[45] * Jul. 20, 1982

[54] HIGH PRESSURE REACTION VESSEL FOR GROWING DIAMOND ON DIAMOND SEED AND METHOD THEREFOR

[75] Inventor: Herbert M. Strong, Schenectady, N.Y.

[73] Assignee: General Electric Company, Worthington, Ohio

[ * ] Notice: The portion of the term of this patent subsequent to Mar. 30, 1999, has been disclaimed.

[21] Appl. No.: 148,214

[22] Filed: May 9, 1980

Related U.S. Application Data

[63] Continuation of Ser. No. 412,190, Nov. 2, 1973, abandoned.

[51] Int. Cl.$^3$ .............................................. C01B 31/06
[52] U.S. Cl. .................................... 423/446; 206/525; 422/240
[58] Field of Search .......................... 423/446; 425/77; 206/525; 422/129, 240, 242

[56] References Cited

U.S. PATENT DOCUMENTS

| | | | |
|---|---|---|---|
| 3,297,407 | 1/1967 | Wentorf | 423/446 |
| 3,303,053 | 2/1967 | Strong et al. | 423/446 X |
| 3,317,035 | 5/1967 | Cannon | 423/446 X |
| 3,346,102 | 10/1967 | Strong | 423/446 X |
| 3,423,177 | 1/1969 | Bovenkerk | 423/446 |

OTHER PUBLICATIONS

Armagnac, "Popular Science", vol. 197, No. 3, 1970, pp. 82, 83, 134, 137.

Primary Examiner—Edward J. Meros
Attorney, Agent, or Firm—Morgan, Finnegan, Pine, Foley & Lee

[57] ABSTRACT

Means are described for suppressing spontaneous diamond nucleation in the vicinity of diamond seed material located in reaction vessel construction used in the growth of diamond by the process disclosed in U.S. Pat. No. 3,297,407—Wentorf, Jr.

In assembly of the reaction vessel a portion of the lower surface of the plug of catalyst-solvent metal is disposed in contact with the diamond seed material. Preferably all of the balance of the lower surface area of the catalyst-solvent plug adjacent the seed material is covered with a disc or layer of a material different from the catalyst-solvent metal employed and selected from a list of specific materials that suppress diamond nucleation.

30 Claims, 4 Drawing Figures

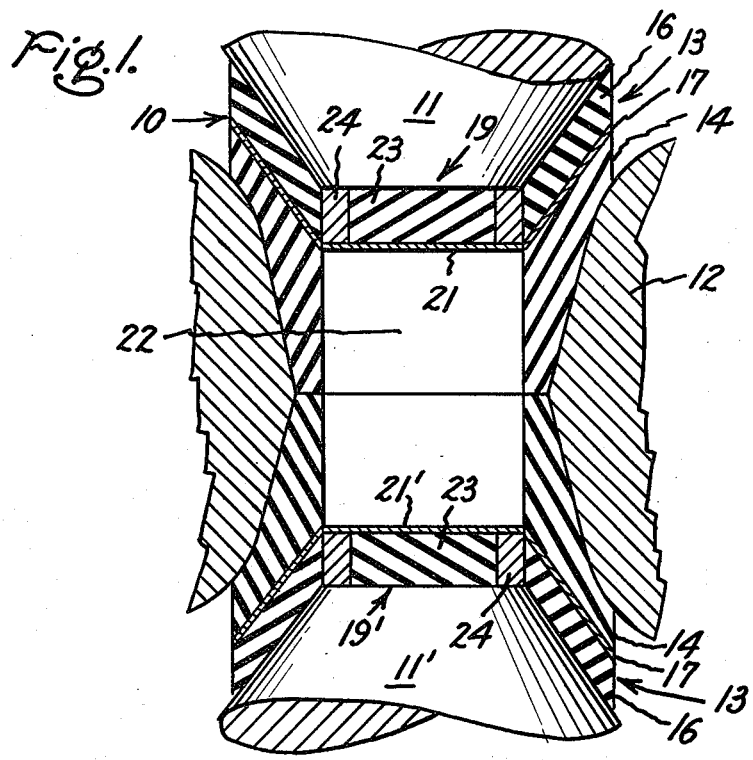
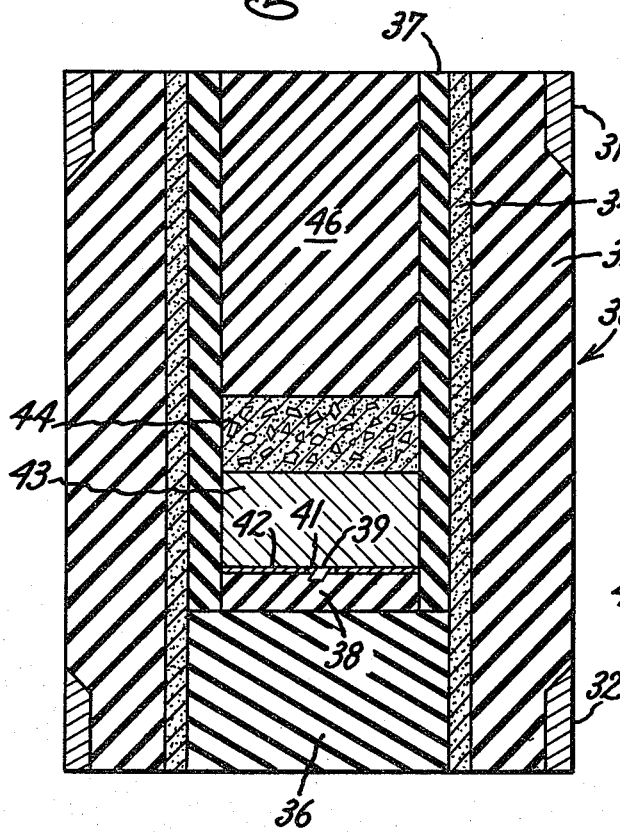
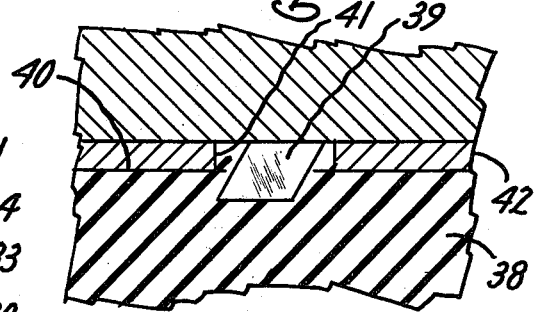
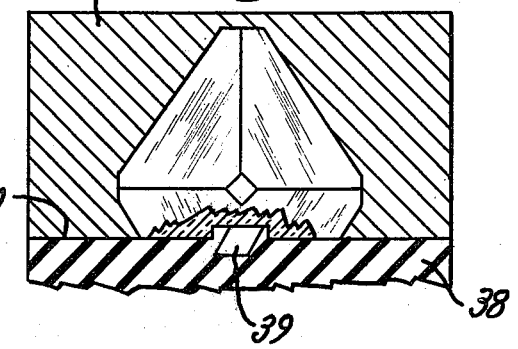

HIGH PRESSURE REACTION VESSEL FOR GROWING DIAMOND ON DIAMOND SEED AND METHOD THEREFOR

CROSS-REFERENCE TO RELATED APPLICATION

This application is a continuation of application Ser. No. 412,190, filed Nov. 2, 1973, now abandoned.

BACKGROUND OF THE INVENTION

The synthesis of diamond crystals by high pressure, high temperature processes has become well established commercially. Preferred methods for making diamonds are disclosed and claimed in U.S. Pat. Nos. 2,947,610—Hall et al and 2,947,609—Strong. Apparatus for the conduct of such processes is described and claimed in U.S. Pat. No. 2,941,248—Hall. The Hall et al, Strong and Hall patents are incorporated by reference.

Diamond growth in the aforementioned processes occurs by the diffusion of carbon through a thin metallic film of any of a series of specific catalyst-solvent materials. Although such processes are very successfully employed for the commercial production of industrial diamond, the ultimate crystal size of such diamond growth is limited by the fact that the carbon flux across the catalyst film is established by the solubility difference between graphite (the typical starting material) and the diamond being formed. This solubility difference is generally susceptible to significant decrease over any extended period due to a decrease in pressure in the system and/or poisoning effects in the graphite being converted.

On the other hand, in the method of growing diamond on a diamond seed crystal disclosed in U.S. Pat. No. 3,297,407—Wentorf, Jr. (incorporated by reference) a difference in temperature between the diamond seed and the source of carbon is relied upon to establish a concentration gradient in carbon for deposition on the seed. Catalyst-solvents disclosed in the aforementioned Hall et al and Strong patents are used in the temperature gradient method as well. The growth of diamond on the seed material is driven by the difference in solubility of diamond in the molten catalyst-solvent metal at the nutrient (source of carbon) and at the seed, between which locations a temperature gradient exists. Most important, this general type of reaction vessel configuration presents a pressure stable system so that pressure can more readily be kept in the diamond stable region.

By very carefully adjusting pressure and temperature and utilizing relatively small temperature gradients with extended (relative to growth times for thin film method) growth times larger diamonds can be produced by the method as taught in the Wentorf patent than by the thin-film method. However, attempts to increase crystal sizes to much greater than about 1/20 carat (by increasing the growth times by 5 to 10 times the aforementioned "extended" growth times) has shown that with these longer growth times the strong tendency for spontaneous nucleation of diamond crystals to occur at the underside of the molten catalyst-solvent metal develops into a serious problem, because that diamond nucleation occurring near the diamond seed material competes with the growth from the seed diamond resulting in the development of multiple crystals which collide as they grow and as a consequence produce stress fractures in the colliding crystals.

Therefore, in order to enlarge the potential of the Wentorf discovery it is important to overcome the problem of spontaneous nucleation in the vicinity of the diamond seed material.

SUMMARY OF THE INVENTION

The instant invention provides a solution to this problem of spurious diamond crystal growth thereby improving the capability of the Wentorf invention for producing larger, sounder crystal growth with increased growth periods in a reliable manner.

Thus, means are provided for suppressing spontaneous diamond nucleation in the vicinity of the diamond seed material. In the assembly of the reaction vessel employed a disc, or layer, of a material different from the catalyst-solvent and selected from a specific group of materials is disposed over that surface of the plug of catalyst metal, which makes contact with the portion of the diamond seed(s) to serve as a "template" for the new diamond growth. Each diamond seed makes contact with the plug of catalyst-solvent metal through the layer of material or (in the case of a solid disc) through an appropriately sized hole. The selected group of materials consists of cobalt, iron, manganese, titanium, chromium, tungsten, vanadium, niobium, tantalum, zirconium, alloys of the preceding recitation of metals, natural mica, polycrystalline high-density alumina, alumina powder, quartz, silica glass, hexagonal boron nitride crystals, cubic boron nitride crystals, wurtzite-structure boron nitride crystals and silicon carbide protected with one of the metals of the platinum family.

BRIEF DESCRIPTION OF DRAWING

This invention will be better understood from the following description and drawing in which:

FIG. 1 illustrates one exemplary high pressure, high temperature apparatus useful in the practice of this invention;

FIG. 2 illustrates in an enlarged view a preferred reaction vessel construction assembled in accordance with this invention;

FIG. 3 is an even larger scale view of the vicinity of the diamond seed material shown in FIG. 2 and FIG. 4 shows the relation between the new diamond growth and the diamond seed.

DESCRIPTION OF THE PREFERRED EMBODIMENT

One preferred form of a high pressure, high temperature apparatus in which the reaction vessel of the instant invention may be employed is the subject of the aforementioned U.S. Pat. No. 2,941,248—Hall and is schematically illustrated in FIG. 1.

In FIG. 1, apparatus 10 includes a pair of cemented tungsten carbide punches 11 and 11' and an intermediate belt or die member 12 of the same material. Die member 12 defines a centrally-located aperture and in combination with punches 11, 11' defines two annular volumes. Between punch 11 and the die 12 and between punch 11' and the die 12 there are included gasket/insulating assemblies 13, 13', each comprising a pair of thermally insulating and electrically non-conducting pyrophyllite members 14 and 16 and an intermediate metallic gasket 17. The aforementioned assemblies 13, 13' together with end cap assemblies 19, 19' and electrically conductive metal end discs 21, 21' serve to define the volume 22 occupied by reaction vessel 30. Each end cap assembly comprises a pyrophyllite plug, or disc, 23 surrounded by an electrical conducting ring 24.

Reaction vessel 30 (FIG. 2) is of the general type disclosed in U.S. Pat. No. 3,030,662—Strong (incorporated by reference) modified by the addition of steel retaining rings 31 and 32. Hollow cylinder 33 is preferably made of pure sodium chloride, but may be made of other material such as talc.

Broad criteria for the selection of the material for cylinder 33 are that the material (a) not be converted under pressure to a stronger and stiffer state as by phase transformation and/or compaction and (b) be substantially free of volume discontinuities appearing under the application of high temperatures and pressures, as occurs for example with pyrophyllite and porous alumina. The materials meeting the criteria set forth in U.S. Pat. No. 3,030,662 (column 1, line 59 through column 2, line 2) are useful for preparing cylinder 33. Positioned concentrically within and adjacent cylinder 33 is a graphite electrical resistance heater tube 34. Within graphite heater tube 34 there is in turn concentrically positioned cylindrical salt liner plug 36 upon which are positioned hollow salt cylinder 37 and its contents.

Operational techniques for applying both high pressures and high temperatures in this apparatus are well known to those skilled in the art. The foregoing description relates to merely one high pressure, high temperature apparatus. Various other apparatuses are capable of providing the required pressures and temperatures that may be employed within the scope of this invention. Pressures, temperatures, metallic catalyst-solvents and calibrating techniques are disclosed in the aforementioned patents incorporated by reference.

The bottom end of cylinder 37 encloses the embedment disc 38 having at least one diamond seed 39 embedded therein. As shown, seed 39 is located in a portion of disc 38 projecting from surface 40 thereof a sufficient distance to present the exposed face of seed 39 through hole 41 in nucleation suppressing layer 42 made up of a layer of particulate material or a solid disc. Hole 41 is filled with the salt projection presenting the exposed upper surface of diamond seed material 39 (preferably a cube face) into contact with the undersurface of plug 43 of metallic catalyst-solvent. The thickness of plug 43 helps determine the temperature difference prevailing in the cell. With a thicker slug, the temperature difference is greater. Also located within salt cylinder 37 are the nutrient supply 44 and salt cylinder 46 disposed thereover. The vertical dimension of plug 43 also affects the temperature gradient.

Pressure-transmitting members 36, 37, 38 and 46 are made of material meeting the same criteria as the material for cylinder 33. All of parts 33, 36, 37, 38 and 46 are dried in vacuum for at least 24 hours at 124° C. before assembly. Other combinations of shapes for the pressure-transmitting members 36, 37, 38 and 46 may, of course, be employed. However, the arrangement of these parts shown in FIG. 2 has been found to be the most convenient to prepare and assemble.

When reaction vessel 30 is disposed in space 22, heater tube 34 forms electrical contact between end discs 21, 21' so that heat may be controllably applied during conduct of the process.

Nucleation suppressing layer 42 is composed of a material different from the catalyst-solvent employed and selected from the group consisting of cobalt, iron, manganese, titanium, chromium, tungsten, vanadium, niobium, tantalum, zirconium, alloys of the preceding metals, natural mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family. Silicon carbide particles are preferably mixed with an inert material, such as, sodium chloride and formed as a solid disc having the upper surface thereof (in contact with the underside of plug 43) covered with a thin layer of one of the platinum family metals.

When a metallic disc is used with a hole in it, the ratio of the diameter of the hole to the largest dimension of the seed should be in the range of 1.5:1 to 5:1. The thickness of the nucleation suppressing layer 42, would range from about 1 to about 10 mils. The natural mica, e.g. muscovite should first be fired at about 800° C. for 12–15 hours. The preferred thickness of mica is about 2–3 mils.

The nutrient material 44 may be composed of diamond, diamond plus graphite or may be entirely of graphite, if desired. The graphite occupies any void space. It is preferred that the nutrient contain mostly diamond in order to reduce the volume shrinkage that can result during conduct of the process. In conduct of the process any graphite present at operating temperatures and pressures converts to diamond before going into solution in the catalyst-solvent metal. Thus, the pressure loss is minimized so that the overall pressure remains in the diamond-stable region at the operating temperature.

Enough of the surface of the underside of catalyst-solvent metal plug 43 is covered by layer 42 to provide an environment adjacent the seed 39 to suppress spontaneous diamond nucleation for a considerable distance around diamond seed 39. Preferably the entire underside of plug 43 around diamond seed 39 is covered by layer 42, but if less than the rest of the entire surface is covered, the layer 42 should extend at least 50% greater distance in all directions from the seed than the lateral growth dimension desired for the diamond. If the disc 42 is made of one of the metallic materials listed above, some space must exist between the diamond seed 39 and the wall of hole 41 into which the material of disc 38 will extend. This relation is shown more clearly in FIG. 3.

The exact mechanism (or mechanisms) by which discs, or layers, of these diamond nucleation suppressor materials located in the manner described function to reduce or eliminate diamond nucleation in the vicinity of the diamond seed 39 is not known for certain. However, it has been found that in this way diamond nucleation can be held back at least until the seeded growth becomes quite large, well formed and capable of accepting the full carbon flux presented thereto during operation at temperature differentials with which in identical systems without the nucleation suppression disc, spurious diamond nucleation resulted in a clustered mass of diamond growth.

As is shown in FIG. 4 the developing new diamond projects into bath 43 (FIG. 4 is drawn for an arrangement in which layer 42 is dissolved by the catalyst-solvent metal) as it grows. After termination of the run and reduction of temperature and pressure to permit removal of the reaction vessel 30, the new diamond growth embedded in the solidified metallic catalyst-solvent 43 readily detaches from the seeding site(s). The diamond(s) so prepared is easily removed by breaking open the mass 43. Any recess or surface roughness may then be polished away.

In each of the following examples the reaction vessel configuration provided a temperature differential in the 20°–30° C. range, the nutrient consisted of 1 part by weight SP-1 graphite and 3 parts by weight 325 mesh diamond prepared by the thin film method, seeds used were $\frac{1}{4}$ to $\frac{1}{2}$ mm, the catalyst-solvent is 70Ni30Fe and temperatures were measured using a Pt/Pt 10 Rh thermocouple:

EXAMPLE 1

[Run 815]

| | |
|---|---|
| Pressure | 57 kb |
| Temperature (14.0–14.2 mv) | 1430–1450° C. |
| Nutrient | 210 mgm |
| Nucleation Suppressing Layer | None |
| Time | 24 hours |

At least 10 yellow diamond crystals grew together in a cluster. The $\frac{1}{2}$ mm seed had dissolved a little and had grown back in. The crystals were either octahedra or cubo-octahedra.

EXAMPLE 2

[Run 816]

| | |
|---|---|
| Pressure | 57 kb |
| Temperature (14.0–14.2 mv) | 1430–1450° C. |
| Nutrient | 210 mgm |
| Nucleation Suppressing Layer | 5 mil Fe disc with an 80 mil hole (as in FIG. 2) |
| Time | 5 hours, 40 min. |

Only one yellow diamond crystal grew developing from the diamond seed. There was no spurious nucleation of diamond. The crystal was an octahedron with small cube faces at the points.

EXAMPLE 3

[Run 817]

| | |
|---|---|
| Pressure | 57 kb |
| Temperature (14.0–14.2 mv) | 1430–1450° C. |
| Nutrient | 210 mgm |
| Nucleation Suppressing Layer | as in Example 2 but slightly smaller in diameter than plug 43 |
| Time | 31½ hours |
| Weight of Seeded Growth | 43.7 mgm |

Very nice single seeded growth developed, well-shaped, symmetrical and relatively flaw-free. The crystal was a yellow octahedron with small cube faces at the points. A small diamond crystal developed where the underside of plug 43 was not covered with the Fe disc 42. This experiment confirmed the nucleation suppressing capabilities of Fe. There was, however, partial dissolution of the seed before new growth began.

EXAMPLE 4

[Run 818]

Pressure, temperature and nutrient weight were the same as in EXAMPLE 1 and no nucleation suppressing layer was employed. The time was 24½ hours. As in EXAMPLE 1, a cluster of yellow crystals developed from spontaneous nucleation. The seed grew to about 2×2 mm with a diamond "barnacle" attached thereto. Also five other individual small crystals grew from spontaneous nucleation.

EXAMPLE 5

[Run 906]

| | |
|---|---|
| Pressure | 58 kb |
| Temperature (14.0–14.2 mv) | 1430–1450° C. |
| Nutrient | 200 mgm |
| Nucleation Suppressing Layer | 1 mil Ti disc as in FIG. 2 |
| Time | 43 hours |
| Weight of Seeded Growth | 147.6 mgm |

A single light yellow crystal was formed from the seed. There was no spontaneous nucleation of diamond. The flaw content was minor. The crystal had a very low nitrogen content.

Experiments with different reaction vessel constructions have verified the excellent nucleation suppressing capabilities of cobalt and natural mica and the useful nucleation suppressing capabilities of tungsten. In the same manner the lack of utility of synthetic mica, platinum, nickel and molybdenum as nucleation suppressing materials has been demonstrated.

Designations of the diamond seed are schematic and no attempt has been made to show the preferred disposition.

What I claim as new and desire to secure by Letters Patent of the United States is:

1. In a reaction vessel for introduction into the reaction volume of a high pressure, high temperature apparatus, said reaction vessel constituting an assembly of interfitting elements for enclosing diamond seed material and a source of substantially pure carbon separated by a mass of metallic catalyst-solvent for the diamond-making reaction disposed therebetween so as to provide a predetermined temperature gradient between said diamond seed material and said source of carbon under operating conditions of pressure and temperature above the graphite-to-diamond equilibrium line on the phase diagram of carbon, said diamond seed material and said source of carbon being located in separate regions of said reacion vessel such that under said operation conditions said diamond seed material will be at a temperature near the minimum value of temperature for said temperature gradient and simultaneously said source of carbon will be at a temperature near the maximum value of temperature for said temperature gradient, the improvement comprising:

(a) a layer of diamond nucleation suppressing material disposed in direct contact with the underside of the mass of metallic catalyst-solvent, said nucleation suppressing layer being made of a material different from the catalyst solvent and being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium, and alloys of the preceding metals, said metal capable of holding back diamond nucleation thereby suppressing unwanted spontaneous diamond nucleation;

(b) the diamond seed material also being disposed in direct contact with the underside of said mass of metallic catalyst-solvent through said nucleation suppressing layer; and (c) said nucleation suppressing layer and said mass of metallic catalyst-solvent being of different materials in any given reaction vessel construction.

2. The improvement recited in claim 1 wherein the diamond seed material is a single crystal.

3. The improvement recited in claim 2 wherein the diamond seed is oriented with a cube face thereof in contact with the mass of metallic catalyst-solvent.

4. The improvement recited in claim 1 wherein the diamond seed material consists of single crystals at spaced locations.

5. The improvement recited in claim 1 wherein the nucleation suppressing layer is metallic and the diamond projects through a hole therein and is spaced from the edges of said hole.

6. The improvement recited in claim 1 wherein the nucleation suppressing layer is cobalt.

7. In the process for producing diamond material wherein a reaction vessel containing (a) diamond seed material and (b) a source of carbon separated by (c) a mass of catalyst-solvent material for the diamond-making process is subjected to simultaneous pressurizing and heating at a pressure and temperature in the diamond stable region of the phase diagram for carbon; said source of carbon, said catalyst-solvent material and said diamond seed material being disposed in said vessel so that during said pressurizing and heating a predetermined temperature gradient exists between said diamond seed material and said source of carbon such that said diamond seed material is at the minimum value of temperature for said temperature gradient while said source of carbon is at the maximum value of temperature for said temperature gradient, the improvement of inhibiting diamond growth in the peripheral vicinity of said diamond seed material at least until substantial diamond growth has developed from said diamond seed material by the use of a layer of nucleation suppressing material, different from said mass of catalyst-solvent material, disposed in contact with the underside of the mass of catalyst-solvent material in the area peripheral to said diamond seed material, said nucleation suppressing material being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium, and alloys of the preceding metals, said metal capable of holding back diamond nucleation thereby suppressing unwanted spontaneous diamond nucleation the diamond seed material being in direct contact with the mass of catalyst-solvent to allow unrestricted diamond growth from the seed material freely into the mass of catalyst-solvent under the operating conditions, whereby diamond growth greater than about 1/20 carat is produced.

8. A process for the production of diamond material comprising the steps of:

pressurizing a reaction vessel containing a diamond seed material and a source of carbon, separated by a mass of catalyst-solvent material to a pressure in the diamond stable region of the phase diagram for carbon; while simultaneously heating said reaction vessel in such a manner to create within said vessel a temperature gradient in said diamond stable region such that the diamond seed material is at a temperature near the minimum temperature of said gradient and said source of carbon is at a temperature near the maximum temperature of said gradient, whereby a temperature gradient is created between the said seed material and carbon source; maintaining the diamond seed material in contact with the mass of catalyst-solvent material to allow unrestricted diamond growth directly from the seed material freely into the carbon saturated catalyst-solvent mass and inhibiting diamond growth with the use of nucleation suppression material, different from said catalyst-solvent material, said nucleation suppression material being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium, and alloys of the preceding metals, and located in the peripheral vicinity of the diamond seed material under the operating conditions until a substantial diamond growth pattern has been developed from said seed material, said metal capable of holding back diamond nucleation thereby suppressing unwanted spontaneous diamond nucleation whereby diamond growth greater than about 1/20 carat is produced.

9. A process as defined in claim 8 wherein said inhibiting step includes the step of using said nucleation suppression material in the peripheral vicinity of said seed material for a distance of at least 50% greater than the lateral growth dimension of the diamond to be grown.

10. A process as defined in claim 8 wherein said seed material is a single crystal.

11. A process as defined in claim 8 wherein said seed material includes a plurality of single crystals at spaced locations.

12. A process as defined in claim 8 wherein said seed material, carbon source and catalyst-solvent are positioned in stacked planar relationship within said reactor vessel.

13. A process as defined in claim 12 wherein said inhibiting step is performed by interposing a nucleation suppressing layer in the reaction vessel in contact with said mass of catalyst-solvent and circumjacent said seed material prior to said pressurizing and heating steps.

14. A process as defined in claim 13 wherein the suppression layer is a metallic disc and defines a circular hole through which the seed material projects, the ratio of the diameter of the hole to the largest dimension of the seed material being in the range of 1.5:1 to 5:1.

15. A process as defined in claim 13 wherein said suppression layer is from about 1 to about 10 mils in thickness.

16. A process as defined in claim 10 wherein said nucleation suppressing material melts at a temperature higher than said mass of catalyst-solvent and is a material different from said mass.

17. A process as defined in claim 7 wherein said layer is a nucleation suppressing layer which melts at a temperature higher than said mass of catalyst-solvent and is a material different from said mass.

18. A process as defined in claim 7 wherein said diamond seed material is a single crystal.

19. A process as defined in claim 7 wherein the diamond seed is oriented with a cube face thereof in contact with the mass of catalyst-solvent.

20. Apparatus for the production of diamond materials comprising: a reaction vessel containing a diamond seed material and a source of carbon separated by a mass of catalyst-solvent; means for pressurizing said vessel to a pressure in the diamond stable region of the phase diagram for carbon; means for heating said vessel, contemporaneously with pressurization, in such a manner to create a temperature gradient in said diamond stable region within said vessel such that the diamond seed material is at a temperature near the minimum temperature of said gradient and said source of carbon is at a temperature near the maximum temperature of said gradient, whereby a temperature gradient is created between said seed material and carbon source; the seed material being in direct contact with the mass of catalyst-solvent material to allow unrestricted diamond growth from the seed material freely into the carbon saturated catalyst-solvent mass and means, different from said catalyst-solvent, for inhibiting spontaneous diamond nucleation in the vicinity of the seed material under the operating conditions of the diamond making process until a substantial diamond growth pattern has developed from said seed material, whereby diamond growth greater than about 1/20 carat is produced, said diamond nucleation inhibition means being different from said catalyst-solvent and being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium and alloys of the preceding metals, said metal capable of holding back diamond nucleation thereby suppressing unwanted spontaneous diamond nucleation.

21. An apparatus as defined in claim 20 wherein said diamond seed material is a single crystal.

22. An apparatus as defined in claim 20 wherein said seed material, carbon source and catalyst-solvent are arranged in stacked relationship within said vessel.

23. An apparatus as defined in claim 20 wherein said means for inhibiting extends for a distance of at least 50% greater than the lateral growth dimension of the diamond to be grown.

24. An apparatus as defined in claim 20 wherein said inhibiting means is a metallic disc with an opening therein, said seed material being located within said opening, the ratio of the lateral dimension of said opening to the largest dimension of the seed material is in the range of 1.5:1 to 5:1.

25. An apparatus as defined in claim 20 wherein said inhibiting means is a nucleation suppression layer, which melts at a temperature higher than said mass of catalyst-solvent and is a material different from said mass, said layer being positioned in the peripheral vicinity of the seed adjacent the catalyst-solvent.

26. In an apparatus for the production of diamond material comprising:
 (i) a reaction vessel containing a diamond seed material and a source of carbon separated by a mass of catalyst-solvent for the diamond-making process;
 (ii) means for heating said vessel to a temperature in the diamond stable region of the phase diagram for carbon and to create a predetermined temperature gradient in said reaction vessel such that said diamond seed material can be maintained at a temperature near the minimum value of temperature for the temperature gradient at substantially the same time said source of carbon is at a temperature near the maximum value of temperature for said temperature gradient; and
 (iii) means for applying high pressure for operating said reaction vessel in the diamond stable region of the phase diagram for carbon; the improvement comprising:
 (iv) a layer in said reaction vessel adjacent said mass of catalyst-solvent, said layer being a nucleation suppressing layer different from said mass of catalyst-solvent and having at least one opening therein between said diamond seed material and said mass of catalyst-solvent said seed material projecting through said hole into contact with said mass of catalyst-solvent, said nucleation suppressing layer being a metal capable of holding back diamond nucleation at least until the seeded growth becomes quite large, well formed and capable of accepting the full carbon flux selected from the group consisting of cobalt, iron, manganese, titanium, chromium, tungsten, vanadium, niobium, tantalum, zirconium, and alloys of the preceding metals, whereby diamond growth proceeds from said seed material, with said metal capable of holding back diamond nucleation thereby suppressing unwanted spontaneous diamond nucleation adjacent the seed material and diamond growth greater than about 1/20 carat is produced.

27. An apparatus as defined in claim 26 wherein said diamond seed material is a single crystal.

28. An apparatus as defined in claim 27 wherein the diamond seed is oriented with a cube face thereof in contact with the mass of catalyst-solvent.

29. An apparatus as defined in claim 26 wherein said nucleation suppressing layer is cobalt.

30. An apparatus as defined in claim 26 wherein said catalyst-solvent is a Ni-Fe alloy and said nucleation suppression layer is selected from the group consisting of Fe and Ti.

* * * * *